US011319700B2

(12) United States Patent
Fritzsche (10) Patent No.: US 11,319,700 B2
(45) Date of Patent: May 3, 2022

(54) LUBRICATION SYSTEM FOR MARINE OR RV TOILET

(71) Applicant: Ryan M. Fritzsche, Haslett, MI (US)

(72) Inventor: Ryan M. Fritzsche, Haslett, MI (US)

( * ) Notice: Subject to any disclaimer, the term of this patent is extended or adjusted under 35 U.S.C. 154(b) by 293 days.

(21) Appl. No.: 16/798,595

(22) Filed: Feb. 24, 2020

(65) Prior Publication Data
US 2020/0277771 A1 Sep. 3, 2020

Related U.S. Application Data

(60) Provisional application No. 62/813,002, filed on Mar. 2, 2019.

(51) Int. Cl.
| | | |
|---|---|---|
| *E03D 9/02* | (2006.01) | |
| *E03D 5/01* | (2006.01) | |
| *F16N 3/02* | (2006.01) | |
| *F16N 13/08* | (2006.01) | |
| *F16N 23/00* | (2006.01) | |
| *F16N 19/00* | (2006.01) | |
| *B60P 3/32* | (2006.01) | |
| *B63B 29/14* | (2006.01) | |

(52) U.S. Cl.
CPC ............. *E03D 5/01* (2013.01); *F16N 3/02* (2013.01); *F16N 13/08* (2013.01); *F16N 19/003* (2013.01); *F16N 23/00* (2013.01); *B60P 3/32* (2013.01); *B63B 29/14* (2013.01); *F16N 2210/16* (2013.01)

(58) Field of Classification Search
CPC .......... E03D 9/031; E03D 9/005; E03D 9/02; E03D 5/01; E03D 5/016; E03D 5/09; E03D 11/08; E03C 1/046; F16N 3/02; F16N 13/08; F16N 19/003; F16N 23/00; F16N 2210/16; B60P 3/32; B63B 29/14
USPC ............. 4/225.1, 224, 226.1, 321, 431, 432
See application file for complete search history.

(56) References Cited

U.S. PATENT DOCUMENTS

| | | | | |
|---|---|---|---|---|
| 2,501,510 A | | 3/1950 | Gross, Jr. | |
| 3,251,068 A | * | 5/1966 | Milette | E03D 7/00 4/431 |
| 3,514,231 A | * | 5/1970 | Perry | F04B 53/1062 4/354 |
| 3,583,675 A | * | 6/1971 | Palmer | E03D 5/016 4/317 |
| 3,842,445 A | * | 10/1974 | Jones | A47K 11/03 4/315 |
| 3,994,628 A | * | 11/1976 | Kemper | F04D 15/0011 417/288 |
| 4,262,372 A | | 4/1981 | Ryder | |
| 5,142,707 A | | 9/1992 | Prue | |

(Continued)

*Primary Examiner* — Charles P. Cheyney
(74) *Attorney, Agent, or Firm* — Mitchell Intellectual Property Law, PLLC (57) ABSTRACT

A manual lubrication system for a manual toilet flush pump on a manual toilet of the type used in boats and RV's. The lubrication system comprises a lubricant reservoir affixed in parallel to the housing of the manual toilet flush pump laterally opposite the toilet, with a movable lubricant pump head located below the operating handle of the manual toilet flush pump and having an operating axis generally parallel to the that of the manual toilet flush pump's operating handle. A positive manual shutoff normally keeps the lubricant reservoir isolated from the normal in-flow of water to and through the manual toilet flush pump except when lubricant is being manually added during a maintenance procedure.

6 Claims, 7 Drawing Sheets

(56) References Cited

U.S. PATENT DOCUMENTS

| | | | | |
|---|---|---|---|---|
| 5,615,420 | A * | 4/1997 | Guyton | A47K 11/04 4/340 |
| 5,692,250 | A | 12/1997 | Oldfelt et al. | |
| 6,158,061 | A * | 12/2000 | Cameron | E03D 5/01 4/300 |
| 7,725,961 | B2 * | 6/2010 | Martinez | E03D 5/01 4/321 |
| 7,996,929 | B2 * | 8/2011 | Good | E03D 5/01 417/446 |
| 9,663,931 | B2 | 5/2017 | Withrington | |
| 10,407,886 | B2 * | 9/2019 | Ding | E03D 5/024 |
| 2005/0241055 | A1 * | 11/2005 | Mullett | E03D 9/031 4/476 |
| 2007/0245472 | A1 * | 10/2007 | Kao | E03D 9/005 4/300 |
| 2008/0216225 | A1 * | 9/2008 | Juska | F04B 9/14 4/433 |
| 2008/0216905 | A1 * | 9/2008 | Dorsey | F04B 17/06 137/565.11 |
| 2013/0205489 | A1 * | 8/2013 | Rakoczy | B63B 29/14 4/695 |
| 2014/0157504 | A1 * | 6/2014 | Witrington | B63B 29/14 4/433 |
| 2017/0306601 | A1 * | 10/2017 | Harris | E03D 5/01 |

* cited by examiner

LUBRICATION SYSTEM FOR MARINE OR RV TOILET

RELATED APPLICATIONS/PRIORITY BENEFIT CLAIM

This application claims the benefit of U.S. Provisional Application No. 62/813,002, filed Mar. 2, 2019 by the same inventor (Fritzsche), the entirety of which provisional application is hereby incorporated by reference.

FIELD

The subject matter of the present application is in the field of manual pump marine toilets, in particular devices for lubricating the toilet pump mechanisms.

BACKGROUND

Toilets used on boats and other recreational vehicles often use a manual pump flush mechanism. The plastic, rubber, and metal seals and moving parts require regular lubrication to function properly. Many of these parts remain submerged in fresh or salt water for long periods, which tends to dissipate lubricants more quickly and shortens the maintenance interval for needed lubrication.

A problem with lubricating manual flush pumps in such toilets is that the toilets are often installed in the smallest space possible, given the high premium on efficiency and space in less-than-palatial boats and RVs. Disassembling a toilet flush pump mechanism for lubrication in such tight quarters can be difficult and messy.

A further problem with lubricating such manual flush pumps when used in marine toilets or "heads" on boats is the fact that the boats are in the water when the toilets are being used the most, and accordingly require the most frequent lubrication. Disassembling a flush pump for lubrication in a floating boat can be more difficult than if it were stationary and out of the water, especially if the water intake that feeds the pump is below the waterline.

Accordingly, one of the most common techniques for lubricating the manual flush pump on a marine or RV type toilet is to simply pour oil into the toilet bowl, and then operate the pump (i.e, flush the toilet) to draw oil through the pump via the wastewater. A problem with this practice is that oil only comes into contact with the outlet or "wastewater" side of the pump mechanism, leaving the inlet or "supply" water side un-lubricated.

Devices for injecting or otherwise introducing additives into marine and RV-type toilets in various ways are known.

U.S. Pat. No. 2,501,510 to Gross, Jr. shows a marine toilet with external grease cups for lubricating various shafts in the operating mechanism. These lubricated shafts appear to be sealed relative to water moving through the toilet.

U.S. Pat. No. 4,262,372 to Ryder shows a fluid powered pump system useful for injecting a non-lubricant liquid additive such as deodorizing or cleaning fluid into a main stream of liquid flowing through the pump in a pressurized flush toilet of the RV type. This system does not involve a manual flush pump, and is designed for a toilet with a pressurized flush water supply.

U.S. Pat. No. 5,142,707 to Prue shows a unit for injecting a disinfectant, deodorant or the like into the inlet stream of flush water as it is pumped into the bowl of a tankless marine toilet. Prue also discloses an access for introducing fresh water into the vessel's plumbing system for cleaning, and/or to introduce cleaning, lubricating, or winterizing materials into the plumbing system in the off-season to simplify maintenance. However, Prue's access is basically a large plumbing "T" reservoir surrounding a region of holes drilled in the water inlet line to the pump. The access reservoir could not be safely opened when the boat is in the water and the water intake is below water level. Further, the access reservoir is primarily designed for receiving a dropped-in water soluble deodorant cake or detergent. Delivering an accurate, repeatable amount of non-water-soluble lubricant oil to the pump by pouring it in the reservoir chamber around the drilled holes would be difficult or impossible, even if it were safe to open the access reservoir.

U.S. Pat. No. 5,692,250 to Oldfelt et al. shows a vacuum toilet system with a reagent container (deodorizer or cleaning agent) connected to a nozzle for rinsing the bowl in timed relationship to a flush. The reagent may have a lubricating effect for a vacuum discharge valve downstream of the toilet bowl.

U.S. Pat. No. 9,663,931 to Withrington shows a marine toilet sanitizing/deodorizing device with a reservoir of sanitizing fluid, an electronic dose controllable pump for discharging a predetermined dose of sanitizing fluid from the reservoir into a water inlet conduit of a marine toilet system, a flow detector for detecting the flow of water within the water inlet conduit, and a controller for controlling the dose controllable pump upon flow detection by the flow detector. The electrical and space demands of this system are significant for small boats and marine heads, as well as the likely cost of such a system. This electronic system would also be difficult to add to an existing marine toilet, may be prone to failure in a maritime environment, and is non-functional for boats that do not have electrical capabilities.

U.S. Patent Application Publication No. US 2005/0241055 A1 to Mullett et al. shows a portable toilet chemical additive charging system, with a control valve injecting a pre-determined amount of additive to the flush water when flush water is flowed through the control valve to the toilet bowl.

BRIEF SUMMARY

The present invention is a manual lubrication system for a manual flush pump in a marine or RV type toilet, hereafter "manual" toilet. The system is easily added to existing manual toilets in very tight spaces, uses no power, operates equally well at sea, on land, and in storage, and is precise, inexpensive, and reliable. The inventive system further lubricates the entire toilet pump without any disassembly, is user-controllable as to the timing and amount of lubrication added, and is immune to back-flow issues.

The manual lubrication system comprises a lubricant reservoir affixed in parallel to the housing of a manual flush pump. The lubricant reservoir is at least partially translucent so that lubricant level can be visually gauged. The lubricant reservoir includes a manual lubricant pump generally aligned in parallel with the toilet flush pump handle's operating axis, the lubricant pump having a movable pump head that reciprocates relative to the lubricant reservoir and the manual flush pump on the toilet. The movable pump head has a lubricant outlet connected by a flexible, movable lubricant feed line to a T-fitting spliced into the flush water feed line for the manual flush pump.

The lubricant feed line is sufficiently translucent so that lubricant pumped from the reservoir to the water feed line for the toilet pump can be gauged visually, and further so that any backflow of water from the water feed line to the lubricant reservoir can be seen. The lubricant feed line further includes a positive, manual ball-type shutoff valve that can be selectively placed in a closed, no-flow position to prevent the risk of lake or sea water backfilling or flooding the toilet area.

In a further form, the lubricant pump is mounted to the manual flush pump housing on the toilet with an offset bracket that locates the lubricant pump head below the manual flush pump handle.

In still a further form, the lubricant pump is provided as a kit that is easily added to an existing manual flush pump toilet installed in a boat.

These and other features and advantages of the invention will become apparent from the detailed description below, in light of the accompanying drawings.

DETAILED DESCRIPTION

Figure 1:
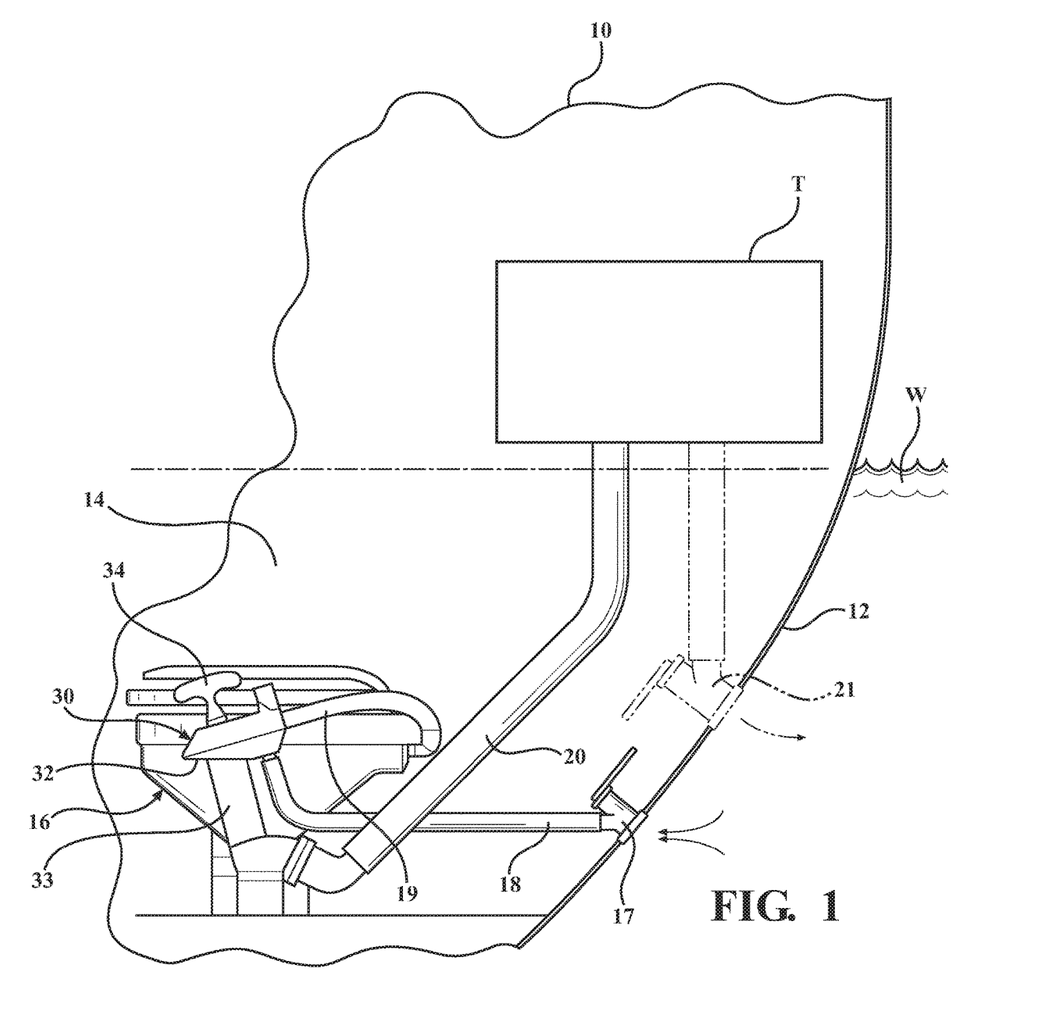
FIG. 1 is a side elevation view of a prior art manual flush toilet system shown relative to a partially cut-away boat hull.

FIG. 1 schematically shows a boat 10 with a partially cut away hull 12, in particular the "head" or bathroom 14 equipped with a common type of commercially available manual flush toilet 16, for example a Jabsco® toilet from Xylem Applied Water, Inc. Toilet 16 receives flushing water from an inlet line 18, in the illustrated example directly from lake or ocean water W through a selectively closeable seacock valve 17 in hull 12. Wastewater is flushed from the toilet 16 through an outlet line 20, either to a holding tank T on the boat, or directly back to the body of water W through another seacock valve 21, depending on applicable regulations governing the handling of onboard wastewater. It will be understood by those skilled in the art that the water inlet and outlet lines 18, 20 may vary in their routing between the toilet and various portions of the boat. It should further be understood that boat 10 may also schematically represent an RV land vehicle, using tank T for wastewater and with an onboard clean water tank of known type replacing the inlet seacock valve 17 for supply water to the toilet.

Toilet 16 is flushed with a manual flush pump 30 installed on and forming an integral part of the toilet mechanism, typically to one side of the toilet with a unitary sealed housing 32. Manual flush pump 30 has a generally vertically-oriented operating handle 34 which, along with the housing 32, is typically set at a vertical or slightly forward-leaning angle relative to the horizontal plane of the toilet seat as shown. Linear reciprocation of operating handle 34 draws flushing water into the upper part of pump 30 through line 18, and then forces water from pump 30 through flush supply line 19 into the toilet bowl and then down and out through a lower portion 33 of the pump housing into wastewater line 20, in known manner. Whether the operating handle 34 is raised or lowered for a water-intake and then lowered or raised for a flush is not important to the invention, provided that the manual pump 30 draws clean water into the pump housing on one part of the stroke and then forces the water through the pump housing and internal pump mechanism into the toilet and out the wastewater line on another part of the stroke.

Figure 2:
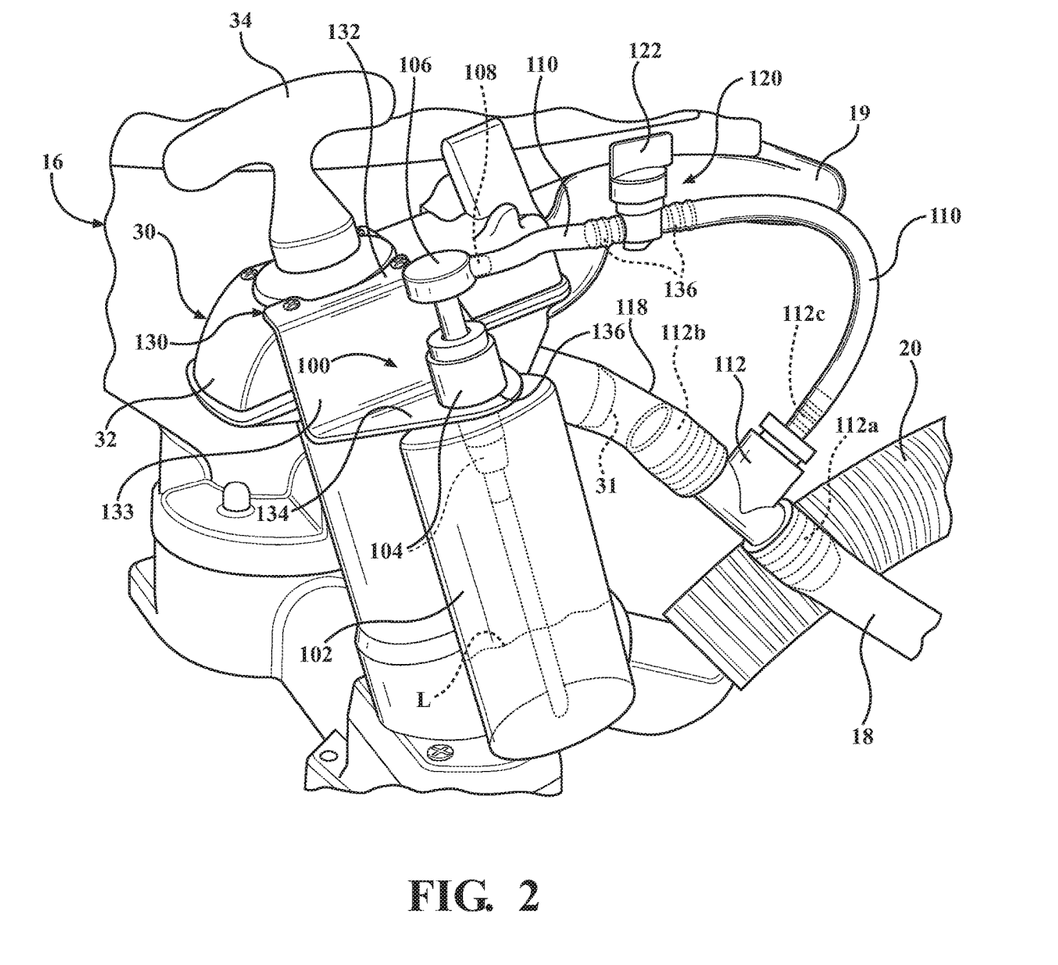
FIG. 2 is a perspective view of a lubrication system according to the invention installed on a manual pump toilet.

Referring next to FIG. 2, a manual lubrication system 100 is shown installed on toilet 16 in exemplary form in order to teach how to make and use the claimed invention. Lubrication system 100 comprises a lubricant reservoir 102, in the illustrated example an elongated, at least partially translucent or transparent plastic bottle holding on the order of 8-16 ounces of lubricant L. Lubricant L may be any known type of natural or synthetic lubricating oil approved or acceptable for use with manual toilets, and is colored distinctly so as to be clearly visible through the wall of reservoir 102 and through the translucent or transparent fluid tubing of the system as described further below.

Lubricant reservoir 102 includes a manual lubricant pump assembly 104 of known, commercially available type, such as used for example in countertop soap dispensers, hand lotion dispensers, and the like. Lubricant pump assembly 104 includes a pump head 106 movable up and down relative to the reservoir 102 and the remainder of the pump assembly 104 in the reservoir 102 to pump a small, consistent quantity of lubricant L out of the reservoir with each (typically downward) stroke through a lubricant outlet 108.

Lubricant L pumped from reservoir 102 enters a lubricant feed line 110 connected to outlet 108 at one end and to a connection 112 in clean water inlet line 18 upstream of pump 30. In the illustrated example, connection 112 is a three port T-fitting with a water inlet stem 112a and a water outlet stem 112b connected to clean water inlet line 18, and a lubricant inlet stem 112c connected to lubricant feed line 110. In the illustrated example, clean water inlet line 18 is made from a flexible translucent hose, and stems 112a and 112b of connection 112 are common barbed connector ends that can be inserted with a watertight fit into open ends of the hose of line 18. Lubricant feed line 110 is also made from a flexible translucent hose, typically smaller in diameter than clean water inlet line 18, and may be tightly secured to the outlet 108 on the lubricant pump head 106, for example with a friction fit or with an optional tube clamp (such as clamp 109 shown in FIG. 4). The illustrated example shows lubricant outlet 108 facing generally rearwardly toward the back of the toilet, which is a preferred orientation.

Lubricant feed line 110 includes a positive, manually-operated shutoff valve 120, in the illustrated example a common type of fluid-tight ball shutoff valve. Shutoff valve 120 will normally remain in the "closed" condition (FIG. 4, phantom lines), except when lubricant is periodically pumped into the toilet system, which may occur for example once every month or two. This prevents the ingress of lake or sea water into the interior of the boat from line 18 via line 110 when the pump 30 is operated for a flush. In most of the drawing Figures herein, the shutoff valve is shown in an "open" condition preparatory to or during the delivery of lubricant L to the toilet feed water line 18.

Figure 3:
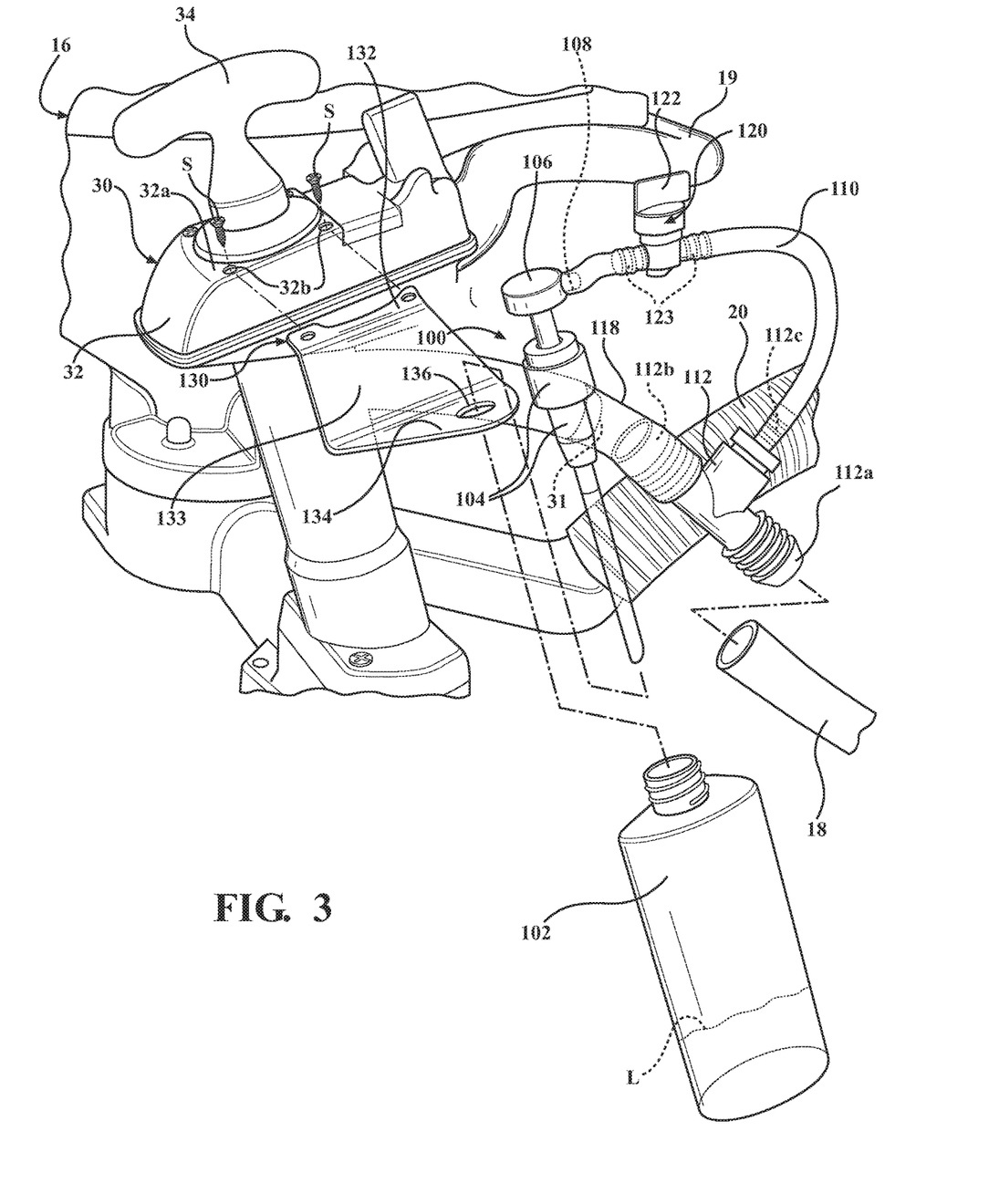
FIG. 3 is an exploded assembly view of the lubrication system of FIG. 1 relative to the manual pump toilet.
Figure 4:
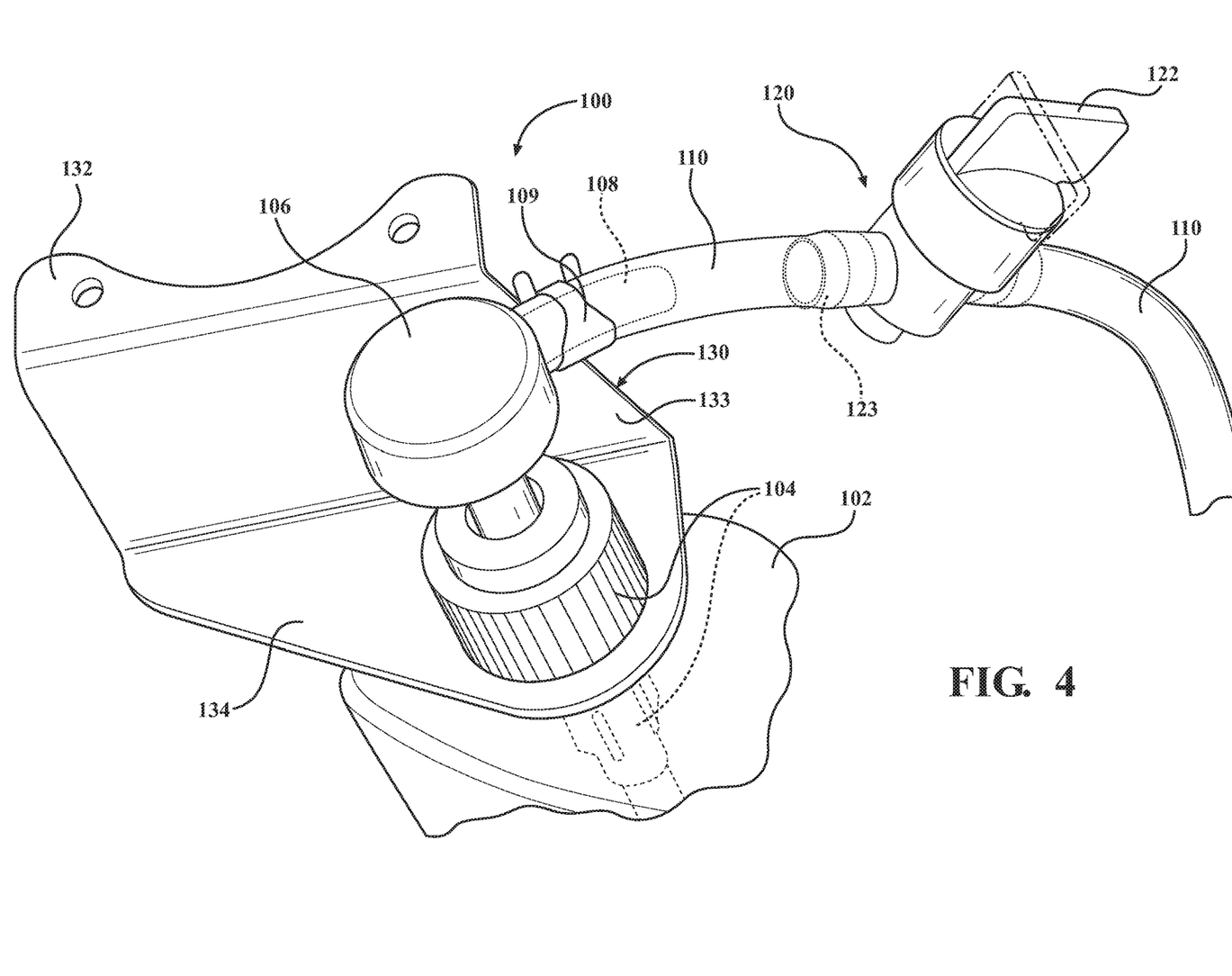
FIG. 4 is a detail perspective view of the upper part of the lubrication system of FIG. 1.

FIGS. 3 and 4 show manual lubrication system 100 in an exploded assembly condition relative to the toilet pump 30, for example where the lubrication system 100 is sold as an aftermarket kit to be added to a previously installed toilet 16. Reservoir 102 is mounted to the pump housing 32 with a generally Z-shaped bracket 130, the bracket having an upper horizontal flange 132 attached to the pump housing with screws or other connectors via holes 32b either formed or existing in the upper surface 32a of the pump housing 32. Bracket 130 has a vertical sidewall 133 that positions a lower horizontal flange 134 below the upper surface 32a of pump housing 32. Lower horizontal flange 134 on bracket 130 includes a slot or hole 136 so that the pump head 106 and the remainder of the pump assembly 104 in reservoir 102 can be joined together through flange 134 to positively secure the reservoir 102 and the pump head 106 to the bracket 130. The vertically offset, oppositely-facing lower position of lower flange 134 relative to the upper flange 132 places pump head 106 below the lowermost position of operating handle 34 of the toilet pump. Connection 112 may be inserted in pump inlet supply line 18 by making a split or cut in line 18 and inserting ends 112a and 112b in the split line; alternately, connection 112 may be installed in the supply line 18 to the toilet pump inlet 31 by removing line 18 from the toilet pump supply inlet, inserting connection inlet 112a in the open end of line 18, and providing connection outlet 112b with a short adapter length of hose 118 mating with the diameter of the toilet pump supply inlet 31 for connection thereto.

Figure 7:
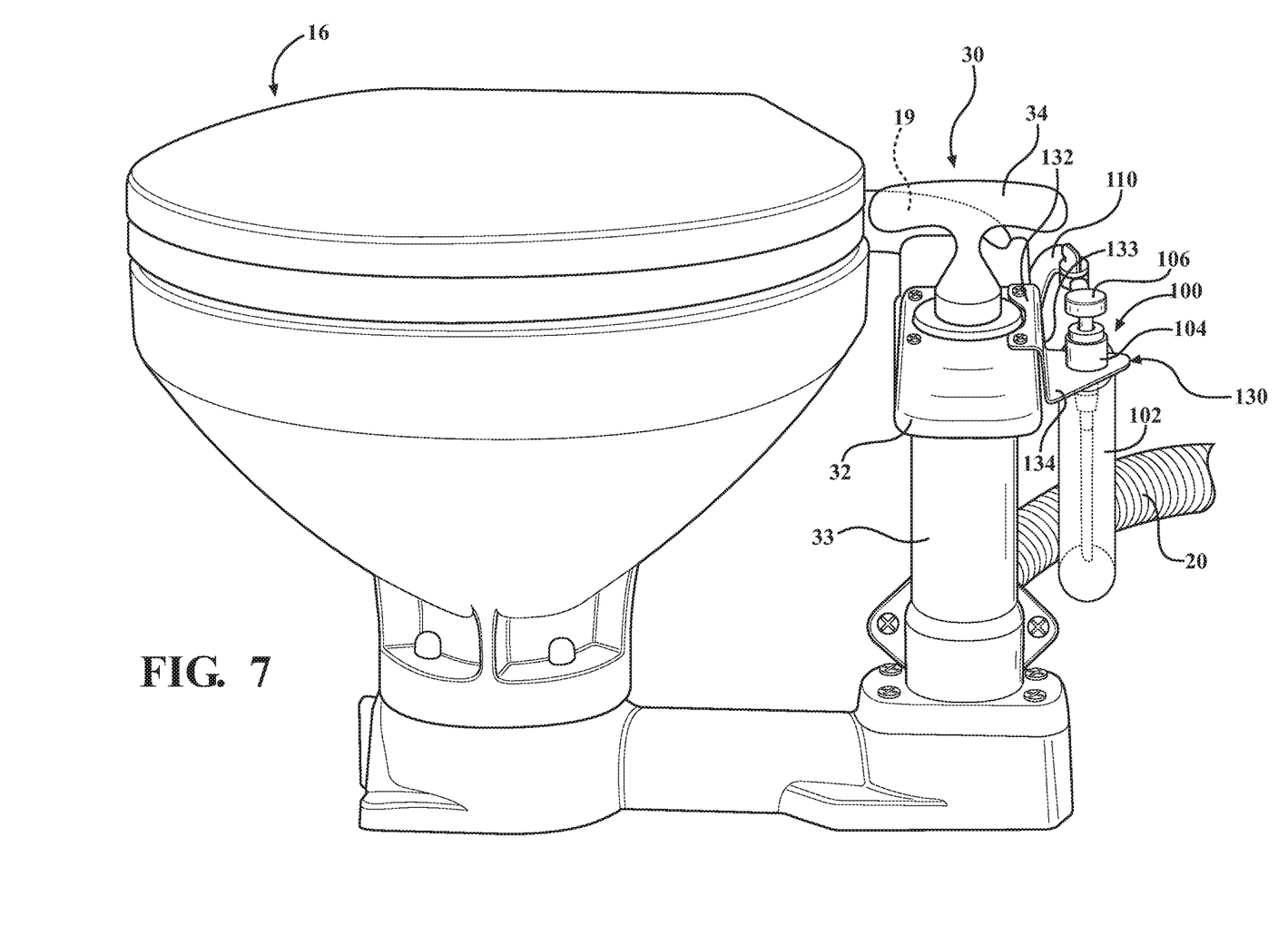
FIG. 7 is a front elevation view of the toilet and lubricant pump of FIG. 1.

A feature of the present invention is the vertically and horizontally offset, generally parallel mounting of lubrication system 100 relative to the toilet pump housing 32, with the lubricant reservoir 102 and pump head 106 offset to one side and positioned below the upper end of the pump housing 32 and operating handle 34 as best shown in FIGS. 2, 3 and 7. Further, the lubricant reservoir 102 and its pump mechanism 104, 106 are preferably mounted to a side of the toilet pump housing laterally opposite the toilet 16, as best shown in FIG. 7, and preferably with the lubricant feed line 110 and water line connection 112 located rearwardly of and below the uppermost part of the toilet pump housing 32 and the operating handle 34. Further, the operating axis of the lubricant pump head 106 is preferably parallel to that of the operating handle 34 of the toilet pump.

Figure 5:
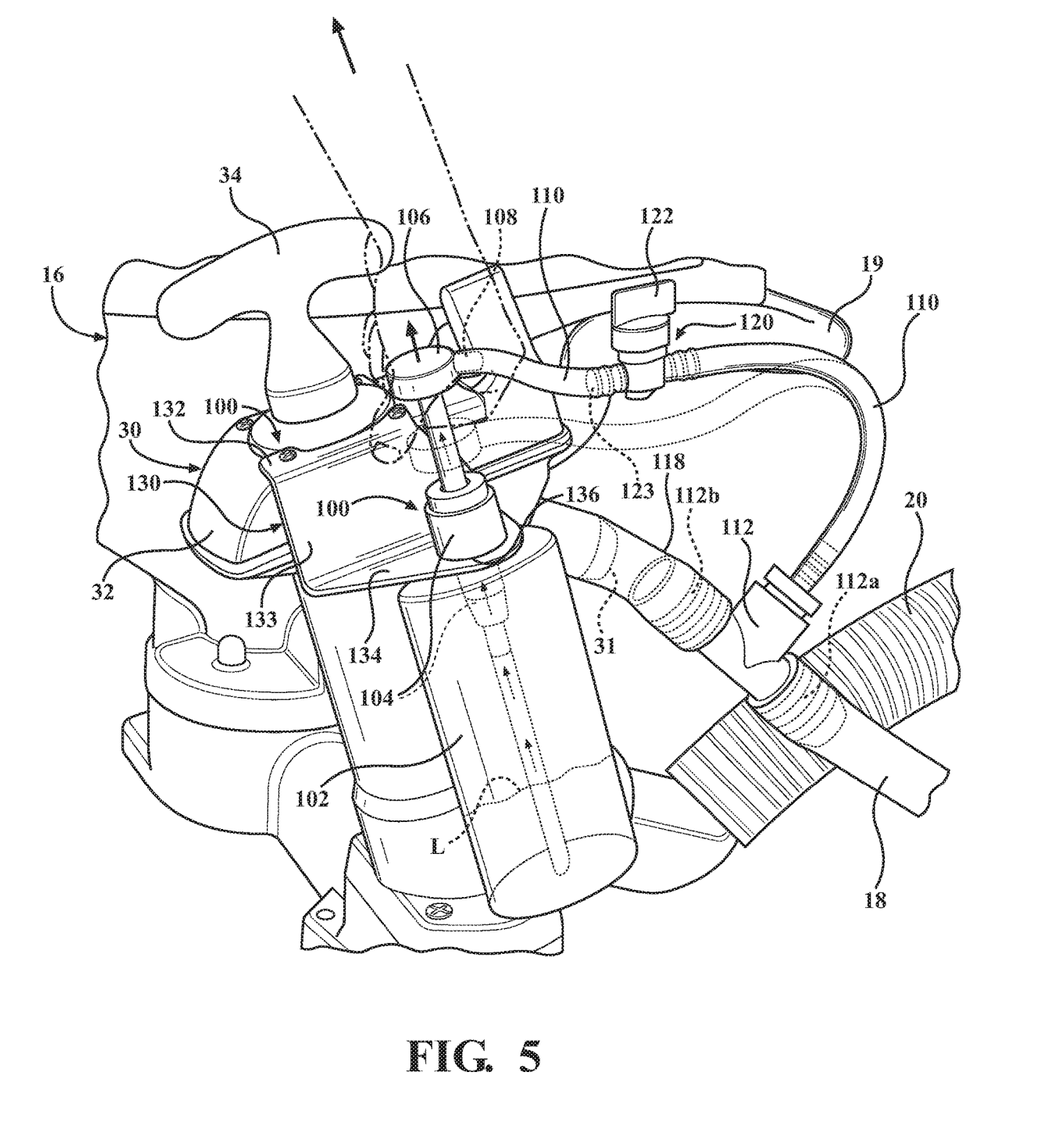
FIG. 5 is similar to FIG. 1, but shows the motion of the lubrication system pump head and supply line relative to the toilet on an upstroke.
Figure 6:
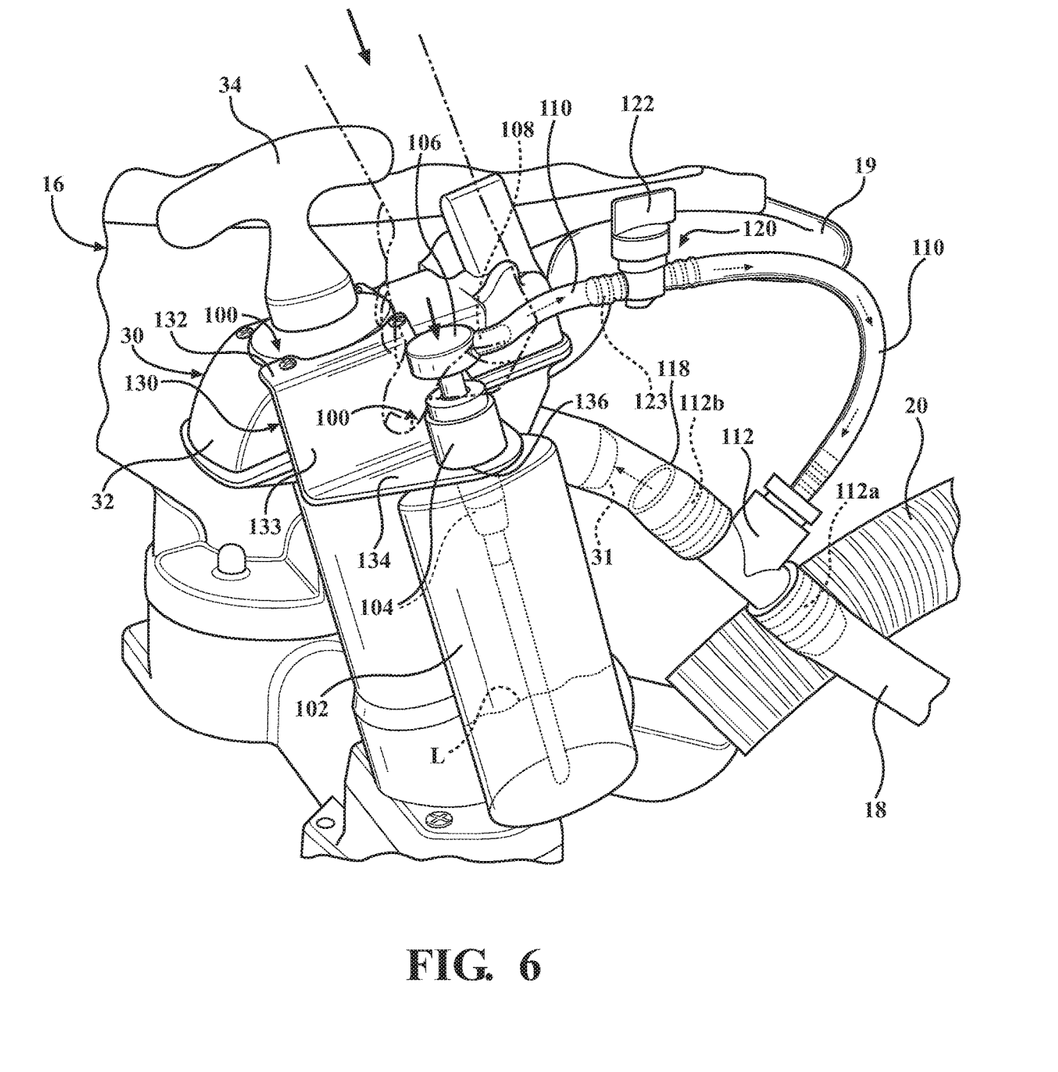
FIG. 6 is similar to FIG. 4, but shows the motion of the lubrication system pump head and supply line relative to the toilet on a downstroke, with a flow diagram of the lubricant to the toilet water supply line.

FIGS. 5 and 6 show the pump head 106 of the lubrication system 100 being operated to pump controlled amounts of lubricant L through feed line 110 into toilet water inlet line 18. In FIG. 5, pump head 106 is shown in a raised position, either lifted manually as shown or held there by an internal bias spring of known type, in order to prime the pump assembly 104 with lubricant L. In FIG. 6, the pump head 106 is pushed downwardly to force lubricant L out through outlet 108 and into feed line 110 to connection 112, where it enters the toilet supply water inlet line 18. The coloring of the lubricant L (e.g., bright blue, red, etc.) allows the entry of lubricant into the translucent water inlet line 18 to be visually verified. Once a desired amount of lubricant L is pumped into water inlet line 18 using pump head 106, shutoff valve 120 is closed, and operating handle 34 on toilet pump 30 is used to draw the lubricant-supplemented water from line 18 into the clean-water side of the internal mechanism of toilet pump 30, then out through flush line 19 to the toilet bowl, and then out of the toilet bowl and into and through the lower internal mechanism of the toilet pump 30 on the wastewater side of the toilet pump mechanism. In this manner the entirety of the internal toilet pump mechanisms exposed to both clean and waste water is lubricated.

Description of Operation

In use, once lubrication system 100 is installed on the housing 32 of toilet pump 30, it remains out of the way and disconnected from normal toilet pump usage, isolated from the flow of water into the toilet from line 18 by the positive manual shutoff valve 120 in a "closed" position. When periodic maintenance lubrication of the internal toilet pump mechanisms is desired, shutoff valve 120 is turned to the "open" position, a precise amount of lubricant L is pumped with head 106 into the clean water inlet line 18, shutoff valve 120 is closed, and the toilet pump is operated like normal to draw and flush the lubricant through the toilet pump.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A combination of a manual lubrication system and a manual toilet flush pump for a manual toilet, the manual flush pump being located to one side of the manual toilet and having a linear reciprocating operating handle having a generally vertical operating axis, the manual lubrication system comprising:
   a lubricant reservoir affixed in a generally parallel fashion to a housing of the manual flush pump laterally opposite the manual toilet, the lubricant reservoir being at least partially translucent and a lubricant therein being colored so that a lubricant level can be visually gauged;
   the lubricant reservoir including a manual lubricant pump assembly with a movable lubricant pump head having an operating axis generally aligned in spaced parallel fashion with the manual toilet flush pump operating handle operating axis, the movable lubricant pump head movable in a linear reciprocating fashion relative to the lubricant reservoir and the manual toilet flush pump on the toilet to pump a small, consistent quantity of lubricant from the lubricant reservoir with each stroke;
   the movable lubricant pump head comprising a lubricant outlet connected by a flexible movable lubricant feed line to a fluid connection in a flush water feed line for the manual toilet flush pump between a clean water supply and the manual toilet flush pump; and
   a manual shutoff valve in the flexible movable lubricant feed line between the movable lubricant pump head and the fluid connection in the flush water feed line.

2. The combination of claim 1, wherein the fluid reservoir is affixed to the housing of the manual toilet flush pump such that the movable pump head in both raised and lowered positions is below the manual flush pump toilet operating handle.

3. The combination of claim 1, wherein the fluid reservoir is affixed to the housing of the manual toilet flush pump in spaced parallel fashion with a Z-shaped bracket.

4. The combination of claim 1, wherein the lubricant outlet on the movable pump head faces rearwardly relative to the toilet.

5. The combination of claim 1, wherein the lubricant feed line is translucent.

6. The combination of claim 5, wherein the manual shutoff valve between the lubricant outlet and the fluid connection in the flush water feed line valve is normally closed when lubricant is not being pumped from the lubricant reservoir to the flush water feed line.

\* \* \* \* \*